(12) United States Patent
Sheem et al.

(10) Patent No.: US 8,592,086 B2
(45) Date of Patent: Nov. 26, 2013

(54) NEGATIVE ELECTRODE COMPRISING AN ADDITIVE WITH A CERAMIC CORE AND CARBON DISPOSED ON THE CORE FOR ENERGY STORAGE DEVICE AND ENERGY STORAGE DEVICE INCLUDING SAME

(75) Inventors: Kyeu-Yoon Sheem, Yongin-si (KR); Bok-Hyun Ka, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 224 days.

(21) Appl. No.: 12/947,754

(22) Filed: Nov. 16, 2010

(65) Prior Publication Data

US 2011/0274978 A1   Nov. 10, 2011

(30) Foreign Application Priority Data

May 6, 2010 (KR) .................. 10-2010-0042555

(51) Int. Cl.
*H01M 4/583* (2010.01)
*H01M 4/40* (2006.01)

(52) U.S. Cl.
USPC .................. 429/231.8; 429/231.95

(58) Field of Classification Search
USPC ............... 429/232, 223, 231.1, 231.2, 231.8, 429/231.95; 252/182.1
See application file for complete search history.

(56) References Cited

U.S. PATENT DOCUMENTS

| | | | | |
|---|---|---|---|---|
| 6,465,127 B1 * | 10/2002 | Shin | | 429/218.1 |
| 2005/0164090 A1 * | 7/2005 | Kim et al. | | 429/232 |
| 2005/0186475 A1 | 8/2005 | Jeong et al. | | |
| 2005/0208380 A1 | 9/2005 | Park et al. | | |
| 2006/0068287 A1 * | 3/2006 | Morita et al. | | 429/223 |
| 2007/0148545 A1 * | 6/2007 | Amine et al. | | 429/231.1 |
| 2007/0264575 A1 * | 11/2007 | Wakita et al. | | 429/232 |
| 2009/0155694 A1 * | 6/2009 | Park | | 429/231.95 |
| 2010/0055563 A1 * | 3/2010 | Nakanishi et al. | | 429/209 |

FOREIGN PATENT DOCUMENTS

| | | |
|---|---|---|
| JP | 10-255807 A | 9/1998 |
| JP | 2000-077278 | 3/2000 |
| JP | 2001-351688 A | 12/2001 |
| JP | 2003-077458 A | 3/2003 |
| JP | 2007-103069 | 4/2007 |
| JP | 2007-522619 A | 8/2007 |
| JP | 2007-305545 A | 11/2007 |
| JP | 2008-016792 | 1/2008 |
| JP | 2009-099287 A | 5/2009 |
| JP | 2009-152197 | 7/2009 |
| KR | 10-0570651 | 4/2006 |
| KR | 1020100035372 A | 4/2010 |
| WO | WO 2009/105863 A1 | 9/2009 |
| WO | WO-2010/035919 A1 * | 4/2010 ............. H01M 4/38 |

OTHER PUBLICATIONS

Machine Translation of: JP 2009-099287 A1, Yozo, May 7, 2009.*
Korean Notice of Allowance dated Dec. 30, 2011, 5 pages.
Japanese Office Action dated Oct. 30, 2012, 4 pages.
Chinese Office Action issued by the Chinese Patent Office on Jun. 19, 2013 in Chinese Appllication No. 201110006876.3 which corresponds to the present U.S. Appl. No. 12/947,754, in 19 pages.

* cited by examiner

*Primary Examiner* — Kenneth Douyette

(74) *Attorney, Agent, or Firm* — Knobbe Martens Olson & Bear LLP

(57) ABSTRACT

Disclosed is a negative electrode for an energy storage device, which includes a negative active material, and an additive including a ceramic core and carbon disposed on the surface of the ceramic core.

16 Claims, 3 Drawing Sheets

(A)          (B)

NEGATIVE ELECTRODE COMPRISING AN ADDITIVE WITH A CERAMIC CORE AND CARBON DISPOSED ON THE CORE FOR ENERGY STORAGE DEVICE AND ENERGY STORAGE DEVICE INCLUDING SAME

CROSS-REFERENCE TO RELATED APPLICATIONS

This application claims priority to and the benefit of Korean Patent Application No. 10-2010-0042555 filed in the Korean Intellectual Property Office on May 6, 2010, the entire contents of which are incorporated herein by reference.

BACKGROUND

1. Field

This disclosure relates to a negative electrode for an energy storage device and an energy storage device including same.

2. Description of the Related Technology

An energy storage device based on electrochemical reaction includes two electrodes, an electrolyte that transfers ions, and a separator.

The electrochemical reaction of the energy storage device is mostly a surface reaction occurring on the surface of an electrode, and a non-uniform reaction. The reaction may be categorized as a mass transfer reaction where chemical species dissociated from the electrolyte are transferred to the surface of an electrode, a non-faradaic reaction, which is an adsorption/desorption reaction where the transferred chemical species form a layer called as an electric double layer on the surface of an electrode, or a faradaic reaction, which is an electron transfer reaction where electrons are directly received and oxidized (or reduced). Among the energy storages using the former reaction is a super capacitor (or electric bilayer capacitor). As for the energy storages using the latter reaction, there is lithium rechargeable battery.

To overcome the capacitance limit of existing super capacitors, a hybrid capacitor using a lithium metal oxide which is usually used as a positive active material of a lithium rechargeable battery for a positive electrode of a super capacitor is being developed, and also researchers are studying to improve the output characteristics of a lithium rechargeable battery by adopting activated carbon, which is a material used for a positive electrode of a super capacitor, to an electrode of a positive active material. Examples of such research include Japanese Patent Laid-Open Publication Nos. 2003-077458 and 2001-351688. The research for increasing the capacitance of an energy storage device continues.

SUMMARY

An example embodiment of this disclosure provides a negative electrode for an energy storage device and an energy storage device including the same.

Another embodiment of this disclosure provides a negative electrode for an energy storage device which includes a negative active material, and an additive including a ceramic core and carbon disposed on the surface of the ceramic core.

Yet another embodiment of this disclosure provides an energy storage device that includes a positive electrode including a positive active material, the negative electrode, and an electrolyte.

According to an embodiment of this disclosure, a negative electrode for an energy storage device includes a negative active material, and an additive including a ceramic core and carbon disposed on the surface of the ceramic core.

The ceramic core may include more than one kind of ceramic including an oxide that does not react with lithium under about less than 1V. Examples of the ceramic may include $SiO_2$, $Al_2O_3$, $ZrO_2$, or a combination thereof.

The carbon may be selected from the group consisting of crystalline carbon, amorphous carbon, and a combination thereof. The carbon may have a Raman spectrum integral intensity of a (D band: 1340 $cm^{-1}$ to 1365 $cm^{-1}$) surface and a (G band: 1580 $cm^{-1}$ to 1595 $cm^{-1}$) surface, which is D/G(I (1340 $cm^{-1}$ to 1365 $cm^{-1}$)/I (1580 $cm^{-1}$ to 1595 $cm^{-1}$)), ranging from about 1 to about 4.

Also, the carbon may have an inter-layer distance d002 ranging from about 0.330 nm to about 5 nm when X-ray diffraction measurement is performed on a (002) surface using a CuKα ray. The carbon may have an inter-layer distance d002 ranging from about 0.330 nm to about 2 nm when X-ray diffraction measurement is performed on a (002) surface using a CuKα ray.

The ceramic core may be made of secondary particles each of which is formed by agglomerating one or more fine primary particles. Also, carbon may be disposed on the surface of primary particles. Herein, the average diameter of the primary particle is of a nm size, but this disclosure is not limited thereto.

The carbon disposed on the surface of the ceramic core or the primary particle may exist to entirely or partially cover the surface of the ceramic core or the primary particle.

Also, regardless of the existing shape of the carbon, the carbon may exist in a thickness ranging from about 2 nm to about 2 μm.

The average particle diameter of the additive may range from about 10 nm to about 5 μm.

The specific surface area of the additive may range from about 10 $m^2/g$ to about 3000 $m^2/g$. The additive may be included in an amount ranging from about 0.1 to 50 parts by weight based on 100 parts by weight of the negative active material.

Also, the carbon may exist in the additive in an amount of more than about 0 wt % to about 50 wt % or less based on the total weight of the additive. According to one embodiment, the carbon may exist in the additive in an amount ranging from about 0.1 wt % to about 30 wt % based on the total weight of the additive.

The negative active material may be selected from the group consisting of a material capable of reversibly intercalating/deintercalating a lithium cation, a lithium metal, a lithium metal alloy, a material capable of doping and dedoping lithium, a transition metal oxide, and a combination thereof. The negative electrode of the energy storage device may further include a conductive material.

According to another embodiment of this disclosure, an energy storage device includes a positive electrode including a positive active material, the above-described negative electrode, and an electrolyte.

Hereinafter, further embodiments of this disclosure will be described in detail.

A negative electrode for an energy storage device according to one embodiment of this disclosure may provide an energy storage device with improved output and capacitance characteristics.

DETAILED DESCRIPTION

Figure 1:
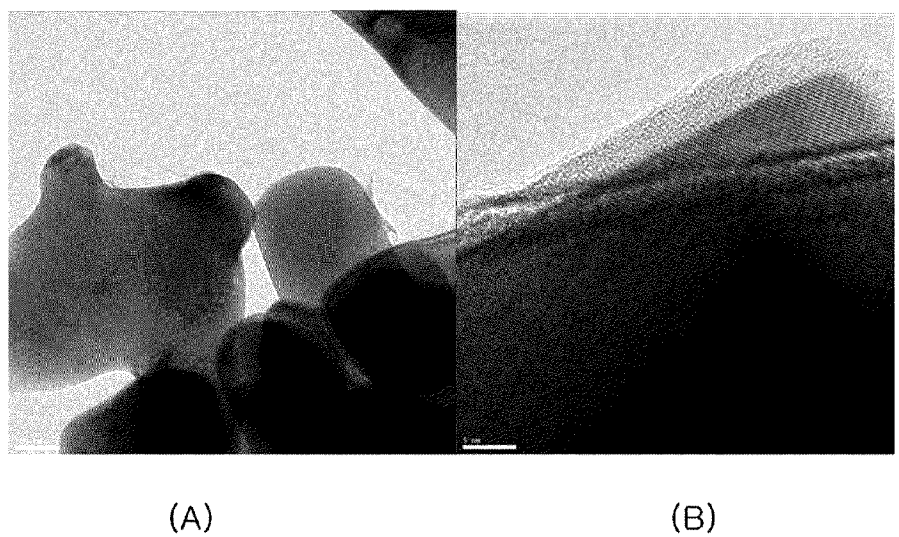
FIGS. 1(A) and 1(B) are transmission electron microscopic (TEM) photographs of an additive prepared according to Example 1.

Example embodiments of this disclosure will hereinafter be described in detail. However, these embodiments are only examples, and this disclosure is not limited thereto.

To improve the output characteristics of an energy storage device, research for improving low-temperature discharge characteristics or high-efficiency discharge characteristics by adding activated carbon, which is a capacitor component, to a positive electrode or a negative electrode as an output enhancement material capacitor and inducing adsorption/desorption of ions has been underway.

For example, when activated carbon is added to a positive active material slurry for a lithium rechargeable battery, the activated carbon is positioned to surround a lithium transition metal oxide, which is a positive active material, and receives electrons from the lithium transition metal oxide. The received electrons are accumulated on the interface with the activated carbon, and negative ions (e.g., $PF_6^-$) of a lithium salt dissociated from the electrolyte solution are gathered around the interface on the surface of the activated carbon through a non-faradaic reaction, and thus the negative ions are adsorbed/desorbed on the surface layer of the activated carbon, thereby improving the output characteristic of a lithium rechargeable battery.

However, when the activated carbon is added to the negative active material slurry for a lithium rechargeable battery, a faradaic reaction accompanied with a reaction of electrons occurs at a voltage of from about 0V to about 1.5V versus lithium metal, and thus the adsorption/desorption reaction of lithium cations, which occurs when the activated carbon is added to a positive electrode, does not readily occur.

Since the specific surface area of the activated carbon is from about 1000 $m^2/g$ to about 3500 $m^2/g$, lithium cations are diffused into the inside of the activated carbon through an intercalation reaction, thus causing a solid electrolyte interface (SEI) generation reaction and generating a great deal of SEI, which is different from the case of the positive electrode. For this reason, battery capacity is remarkably deteriorated. In particular, since the lithium cations are accumulated in the pores inside the activated carbon through a sub-reaction, it produces more SEI, compared with carbon materials having a specific surface area of less than about 1000 $m^2/g$ and substantially not having pores.

In order to add a carbon material to a negative electrode for an energy storage device, it is required to develop a carbon material of a new structure that may cause quick ion diffusion or cause much adsorption/desorption on the surface of lithium cations while producing as little SEI as possible.

A negative electrode for an energy storage device fabricated according to one embodiment of this disclosure includes a negative active material, and an additive including a ceramic core and carbon positioned on the surface of the ceramic core.

The ceramic used as a core in the additive may be any one that does not react with lithium cations. The ceramic functioning as a core in the additive may include at least one kind of ceramic including an oxide that does not react with lithium at a voltage lower than about 1V. The ceramic may include one selected from the group consisting of $SiO_2$, $Al_2O_3$, $ZrO_2$, and a combination thereof, but is not limited thereto.

Also, the core of the additive may comprise secondary particles each of which is obtained by agglomerating more than one primary fine ceramic particle. Also, carbon may exist on the surface of the primary particle.

The carbon may be any kind of carbon that has a surface area of less than about 1000 $m^2/g$ and is substantially free of pores. The carbon may be, for example, crystalline carbon, amorphous carbon, or a combination thereof, but is not limited thereto.

Non-limiting examples of the crystalline carbon include graphite such as amorphous, sheet-type, flake-type, spherical or fibrous natural graphite or artificial graphite, and examples of the amorphous carbon include soft carbon or hard carbon, mesophase pitch carbide, and fired cokes.

The carbon may have a Raman spectrum integral intensity of a (D band: 1340 $cm^{-1}$ to 1365 $cm^{-1}$) surface and a (G band: 1580 $cm^{-1}$ to 1595 $cm^{-1}$) surface, which is D/G(I (1340 $cm^{-1}$ to 1365 $cm^{-1}$)/I (1580 $cm^{-1}$ to 1595 $cm^{-1}$)), ranging from 1 to 4.

The carbon may have an inter-layer distance d002 ranging from about 0.330 nm to about 5 nm when X-ray diffraction is measured on a 002 surface by using a CuK α ray. Also, the carbon may have an inter-layer distance d002 ranging from about 0.330 nm to about 2 nm when X-ray diffraction is measured on a 002 surface by using CuKα ray.

The carbon may be included in the additive in an amount of more than about 0 wt % to about 50 wt % or less based on the total weight. The maximum amount of the carbon may be less than about 50 wt %. Also, the carbon may be included in the additive in an amount of about 0.1 wt % to about 30 wt % based on the total weight.

In the additive, the carbon positioned on the surface of the ceramic core or the primary particle may entirely or partially cover the surface of the ceramic core or the primary particle. In other words, the carbon may exist substantially covering the entire surface of the ceramic, or the carbon may also exist randomly covering part of the surface of the ceramic, for example, exposing part of the surface of the ceramic or the primary particle to the exterior. The form of the carbon existing on the surface of the ceramic core or the primary particle is not a significant factor that may affect obtaining the effect of this disclosure.

Regardless of the form of the carbon existing on the surface of the ceramic core surface or the primary particle, the carbon may exist with a thickness ranging from about 2 nm to about 2 μm. The carbon in the additive retains lithium ions during charge and discharge. When the carbon exists in the thickness of the range, a proper amount of lithium ions may be retained, thus preventing a problem of irreversible capacity from occurring.

As for the carbon in the additive, crystalline carbon or non-crystalline carbon may be used.

The additive according to one embodiment of this disclosure including the ceramic and the carbon on the surface of the ceramic may cause less SEI reaction and improve battery efficiency during charge and discharge, compared with conventional carbon material, such as activated carbon or graphene nano-sheet.

The additive including the ceramic core and the carbon positioned on the surface of the ceramic core has an average particle diameter of about 10 nm to about 5 μm. When the average particle diameter of the additive falls in the range, the carbon positioned on the surface of the additive has a wide specific surface area and thus cations are readily adsorbed in an energy storage device manufactured by adding the additive.

The specific surface area of the additive may range from about 10 m²/g to about 3000 m²/g. According to one embodiment, the specific surface area of the additive may range from about 50 m²/g to about 3000 m²/g. The specific surface area of the additive may be measured by using a BET (Brunauer, Emmett, Teller) method.

The additive may be included in an amount of about 0.1 parts by weight to about 50 parts by weight based on 100 parts by weight of a negative active material. According to one embodiment, the additive may be included in an amount of about 0.5 parts by weight to about 30 parts by weight. Within the range, the effect of using the additive for a negative electrode may be properly acquired without such a problem as a irreversible increase in capacity.

The additive added to the negative electrode for an energy storage device according to one embodiment of this disclosure may be prepared through any method as long as the method positions carbon on the surface of the ceramic core. Examples of the preparation method include a liquid phase method and a gas phase method.

The liquid phase method includes an immersion method and a spray method, and the gas phase method includes a chemical deposition method and a plasma deposition method.

Hereafter, the liquid phase method will be described.

A carbon precursor solution is prepared by adding a carbon precursor to a solvent.

As for the carbon precursor, dihydroxyl naphthalene, citric acid, pitch, or a polymer such as phenol, furfuryl alcohol, and polyacrylonitrile may be used, for example. Also, as for the solvent, an organic solvent such as acetone, methanol, N-methyl pyrrolidone, dimethyl formamide, and toluene may be used.

The concentration of the carbon precursor solution may range from about 1 wt % to about 10 wt %.

A ceramic is added to the carbon precursor solution. Herein, as for the ceramic, more than one kind of ceramic including an oxide that does not react with lithium at a voltage of lower than about 1V may be used. Non-limiting examples of the ceramic include $SiO_2$, $Al_2O_3$, $ZrO_2$, or a combination thereof.

Also, the average particle diameter of the ceramic may range from about 8 nm to about 5 μm. When the average particle diameter of the ceramic falls in the range, the additive may be dispersed well into the electrode plate of the negative electrode. Thus, the effect of using the additive is properly acquired.

The amount of the ceramic added thereto may range from about 1 part by weight to about 50 parts by weight based on 100 parts by weight of the carbon precursor. Of course, the amount of the used ceramic may be properly adjusted within the range according to the kind of the ceramic and the carbon precursor.

Subsequently, the acquired mixture is dried, and undergoes a heat treatment.

The drying process may be a general drying process performed in an oven, for example, or it may be a spray drying process.

The heat treatment process may be performed in an inert gas atmosphere of nitrogen, argon, or a combination thereof.

The heat treatment process may be performed at a temperature rising speed of about 1° C./min to about 5° C./min by raising the temperature from about 700° C. to about 1500° C. According to another embodiment, a primary heat treatment may be performed at a temperature lower than the boiling point of the carbon precursor at a temperature rising speed of about 1° C./min to about 5° C./min, and then after maintaining the temperature of the primary heat treatment, a secondary heat treatment may be performed at a temperature ascending from about 700° C. to about 1500° C. at a temperature rising speed of about 1° C./min to about 5° C./min. Each heat treatment may be performed for about 5 to about 15 hours, regardless of the kind of heat treatment.

Also, a product of the primary heat treatment may be added to the solvent used for the preparation of the carbon precursor solution, filtrated, and then go through a secondary heat treatment, and this method may further improve the purity.

The negative active material used for the negative electrode for an energy storage device is not limited to particular ones. Non-limiting examples of the negative active material may include a material that reversibly intercalates/deintercalates lithium cations, a lithium metal, a lithium metal alloy, a material capable of doping and dedoping lithium, or a transition metal oxide.

The material that reversibly intercalates/deintercalates lithium cations is a carbon material, and any carbon-based negative active material generally used in a lithium cation rechargeable battery may be used, such as crystalline carbon, amorphous carbon, or a combination thereof. The crystalline carbon may be shapeless natural graphite or artificial graphite, or may be sheet, flake, spherical, or fibrous natural graphite or artificial graphite. The amorphous carbon may be, for example a soft carbon, a hard carbon, mesophase pitch carbide, fired coke, and the like.

Examples of the lithium metal alloy includes lithium and a metal such as, for example, Na, K, Rb, Cs, Fr, Be, Mg, Ca, Sr, Si, Sb, Pb, In, Zn, Ba, Ra, Ge, Al, and Sn.

The material being capable of doping and dedoping lithium may include Si, $SiO_x$ (0<x<2), a Si-Q alloy (where Q is an element selected from the group consisting of an alkaline metal, an alkaline-earth metal, a group 13 element, a group 14 element, a transition metal, a rare earth element, and a combination thereof, and is not Si), Sn, $SnO_2$, a Sn—R alloy (where R is an element selected from the group consisting of an alkaline metal, an alkaline-earth metal, a group 13 element, a group 14 element, a transition metal, a rare earth element, and a combination thereof, and is not Sn), and the like. At least one of these materials may be mixed with $SiO_2$. The elements Q and R are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide includes vanadium oxide, lithium vanadium oxide of the following Chemical Formula 1 or 2, or lithium titanium oxide of the following Chemical Formula 3.

$$Li_{x1}V_{y1}M_{d1}O_{2+e1} \qquad \text{Chemical Formula 1}$$

In Chemical Formula 1, 1≤x1≤2.5, 0.5≤y1≤1.5, 0≤d1≤0.5, 0≤e1≤0.5, and M is selected from Mg, Al, Cr, Mo, Ti, W, Zr, Si, Sc, Cu, Nb, Y, or a combination thereof.

$$Li_{x2}M^1_{y2}V_{2-y2}O_{6-z2} \qquad \text{Chemical Formula 2}$$

In Chemical Formula 2, 0≤x2≤1.2, 0≤y2≤2, -2≤z2≤2, and $M^1$ is Mo, Mn, Co, Ni, or a combination thereof.

$$L_{x3}Ti_{y3-z3}M''_{z3}O_{4-z4} \qquad \text{Chemical Formula 3}$$

In Chemical Formula 3, 0.6≤x3≤2.5, 1.2≤y3≤2.3, 0≤z3≤0.5, 0≤z4≤0.5, and M" is V, Cr, Nb, Fe, Ni, Co, Mn, W, Al, Ga, or a combination thereof.

A negative electrode for an energy storage device according to one embodiment of this disclosure includes a negative active material layer including the negative active material and the additive, and a current collector supporting the negative active material layer.

In the negative active material layer, the amount of the negative active material may range from about 80 to about 97 wt % based on the total weight of the negative active material layer, and the amount of the additive may range from about 3 to about 20 wt %.

The negative active material layer includes a binder, and optionally a conductive material. The negative active material layer may include 1 wt % to 5 wt % of a binder based on the total weight of the negative active material layer. In addition, when the negative active material layer further includes a conductive material, it may include 70 to 97 wt % of the negative active material, 1 wt % to 20 wt % of the additive, 1 wt % to 5 wt % of the binder, and 1 wt % to 5 wt % of the conductive material.

The binder improves binding properties of active material particles with one another and with a current collector. The binder may include a water-insoluble binder, a water-soluble binder, or a combination thereof.

Examples of the water-insoluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder includes a styrene-butadiene rubber, an acrylated styrene-butadiene rubber, polyvinyl alcohol, sodium polyacrylate, a copolymer including propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be Na, K, or Li. The cellulose-based compound may be included in an amount of from about 0.1 to about 3 parts by weight based on 100 parts by weight of the binder.

The negative active material layer may further include a conductive material. The conductive material may be any conductive material that is generally used for a rechargeable lithium battery. Examples of the conductive material include a carbon-based material such as natural graphite, artificial graphite, carbon black, acetylene black, ketjen black, carbon fiber, and the like; a metal-based material including a metal powder or a metal fiber including copper, nickel, aluminum, silver, and so on; a conductive polymer such as polyphenylene derivative and the like; or a mixture thereof.

The current collector includes a copper foil, a nickel foil, a stainless steel foil, a titanium foil, a nickel foam, a copper foam, a polymer substrate coated with a conductive metal, or a combination thereof.

The negative electrode for an energy storage device fabricated according to one embodiment of this disclosure may be used for a capacitor or a lithium rechargeable battery.

An energy storage device fabricated according to another embodiment of this disclosure includes a positive electrode having a positive active material; the negative electrode; and an electrolyte.

The positive electrode includes a positive active material layer and a current collector supporting the positive active material layer. The positive active material includes lithiated intercalation compounds that reversibly intercalate and deintercalate lithium ions. The positive active material may include a composite oxide including at least one selected from the group consisting of cobalt, manganese, and nickel, as well as lithium. The following lithium-containing compounds may be used. $Li_aA_{1-b}X_bD_2$ ($0.90 \le a \le 1.8$, $0 \le b \le 0.5$); $Li_aE_{1-b}X_bO_{2-c}D_c$ ($0.90 \le a \le 1.8$, $0 \le b \le 0.5$, $0 \le c \le 0.05$); $LiE_{2-b}X_bO_{4-c}D_c$ ($0 \le b \le 0.5$, $0 \le c \le 0.05$); $Li_aN_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.05$, $0.001 \le d \le 0.1$); $Li_aNi_bCo_cE_eG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide, an oxyhydroxide of a coating element, an oxycarbonate of a coating element, and a hydroxyl carbonate of a coating element. The compound for a coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, and the like.

The positive active material layer may include from about 90 to about 98 wt % based on the total weight of the positive active material layer.

The positive active material layer also includes a binder and a conductive material. The binder and conductive material may be included in amounts of from about 1 wt % to about 5 wt % based on the total weight of the positive active material layer.

The binder improves binding properties of the positive active material particles to one another, and also with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; metal-based materials including a metal powder or a metal fiber of copper, nickel, aluminum, silver, and the like; conductive polymers such as polyphenylene derivatives; or mixtures thereof.

The current collector may be aluminum (Al), but is not limited thereto.

The negative and positive electrodes may be fabricated by a method including mixing the active material, and a binder and optionally a conductive material to provide an active material composition, and coating the composition on a current collector. The electrode manufacturing method is well known, and thus is not described in detail in the present specification. The solvent can include N-methylpyrrolidone and the like, but is not limited thereto. In addition, when a water-soluble binder is used for a negative electrode, water as a solvent may be used to prepare a negative active material composition.

In an energy storage device according to one embodiment, an electrolyte includes a non-aqueous organic solvent and a lithium salt.

The non-aqueous organic solvent serves as a medium for transmitting ions taking part in the electrochemical reaction of the energy storage device. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a $C_2$ to $C_{20}$ linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable energy storage device performance.

The carbonate-based solvent may include a mixture of a cyclic carbonate and a linear carbonate. The cyclic carbonate and the chain carbonate are mixed together in a volume ratio of about 1:1 to about 1:9. When the mixture is used as an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 4.

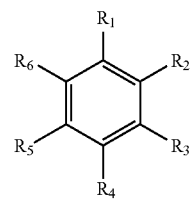

Chemical Formula 4

In Chemical Formula 4, $R_1$ to $R_6$ are independently selected from the group consisting of hydrogen, a halogen, a $C_1$ to $C_{10}$ alkyl group, a $C_1$ to $C_{10}$ haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include a compound of vinylene carbonate, an ethylene carbonate-based compound of the following Chemical Formula 5, or a combination thereof in order to improve the cyle-life characteristics of the energy storage device.

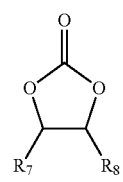

Chemical Formula 5

In Chemical Formula 5, $R_7$ and $R_8$ are the same or different, and are selected from the group consisting of hydrogen, a halogen, a cyano group (CN), a nitro group ($NO_2$), and a $C_1$ to $C_5$ fluoroalkyl group, provided that at least one of $R_7$ and $R_8$ is selected from the group consisting of a halogen, a cyano group (CN), a nitro group ($NO_2$), and a $C_1$ to $C_5$ fluoroalkyl group, provided that both $R_7$ and $R_8$ are hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt supplies lithium ions in the battery, operates a basic operation of an energy storage device, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2E_5)_2$, $LiC_4F_9SO_3$, $LiClO_4$, $LiAlO_2$, $LiAlCl_4$, $LiN(C_yF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. These examples, however, are not in any sense to be interpreted as limiting the scope of this disclosure.

Example 1

Preparation of a Ceramic Additive With Carbon on the Surface

A carbon precursor solution is prepared by adding a dihydroxy naphthalene carbon precursor at 5 wt % to acetone at 95 wt %. 20 g of $Al_2O_3$ having an average particle diameter of about 1 μm is added to 500 ml of the carbon precursor solution, agitated at room temperature for about 24 hours, and then filtrated.

Subsequently, after the filter cake is sufficiently dried in a drying oven set to about 120° C., the temperature is raised from room temperature (25° C.) to about 300° C. at a temperature rising speed of about 5° C./min in the atmosphere of nitrogen inert gas, and then a primary heat treatment is performed at the raised temperature for about 5 hours.

Remaining unreacted dihydroxyl naphthalene is removed by adding the primary heat treatment product to acetone, performing filtration, and removing the filtration solution. Dihydroxyl naphthalene is removed and the remaining filter cake is sufficiently dried in a drying oven set to about 120° C.

Subsequently, the dried product is put into a tube furnace in the atmosphere of nitrogen inert gas with argon implanted thereto and the temperature is raised from room temperature up to about 1200° C. at a temperature rising speed of about 5° C./min, and then a secondary heat treatment is performed to the dried cake for about 5 hours at the raised temperature, to thereby produce an additive of $Al_2O_3$ powder with carbon on the surface.

FIGS. 1(A) and 1(B) are transmission electron microscopic (TEM) photographs of the additive prepared according to Example 1. The carbon of the prepared additive may exist in the form of a layer on the surface of the $Al_2O_3$ powder (see FIG. 1(B)), or it may exist in the form of disconnected mass (see FIG. 1(A)).

The acquired additive has an average diameter of about 3 μm, and it includes fine nanoparticles agglomerated with each other.

Also, the carbon on the surface of the $Al_2O_3$ powder exists in an average thickness ranging from about 4 nm to about 50 nm, and the specific surface area of the additive is about 350 $m^2/g$.

The amount of the carbon on the surface in the additive is about 0.84 wt % based on the total weight of the additive.

Also, the carbon on the surface is amorphous carbon. A Raman spectrum integral intensity between a (D band: 1360 $cm^{-1}$) surface and a (G band: 1580 $cm^{-1}$) of the carbon, which is D/G(I (1360 $cm^{-1}$)/I (1580 $cm^{-1}$)), is found to be about 2.64.

Example 2

Preparation of a Ceramic Additive With Carbon on the Surface

A carbon precursor solution is prepared by adding a citric acid carbon precursor at 2 wt % to methanol at 98 wt %. 100 g of $Al_2O_3$ ceramic powder having an average particle diameter of about 1 μm is put into 500 ml of the carbon precursor solution, and uniformly agitated.

The acquired mixed solution is dried with a spray dryer heated to about 200° C. so as to obtain $Al_2O_3$ ceramic powder coated with citric acid.

The obtained ceramic powder is put into a tube furnace in the atmosphere of nitrogen inert gas and the temperature is raised from room temperature (25° C.) up to about 500° C. at a temperature rising speed of about 2° C./min, and then a primary heat treatment is performed for about 2 hours at the raised temperature.

Subsequently, the temperature is raised from about 500° C. to about 1200° C. at a temperature rising speed of about 5° C./min, and then a secondary heat treatment is performed to the product of the primary heat treatment for about 5 hours at the raised temperature so as to produce an additive of $Al_2O_3$ powder with carbon on the surface.

The average particle diameter of the prepared additive is about 3 μm, the carbon on the surface of $Al_2O_3$ exists in an average thickness of about 4 to about 40 nm, and the specific surface area of the additive is about 300 $m^2/g$.

The amount of the carbon existing on the surface of the additive ranges from about 0.64 wt % based on the total weight of the additive.

Also, the carbon existing on the surface of the additive carbon is amorphous carbon. A Raman spectrum integral intensity between a (D band: 1360 $cm^{-1}$) surface and a (G band: 1580 $cm^{-1}$) surface of the carbon, which is D/G(I (1360 $cm^{-1}$)/I (1580 $cm^{-1}$)), is measured to be about 2.61.

TEM-EDAX for a surface with carbon thereon and the $Al_2O_3$ core is measured with respect to the additive prepared according to Example 2. The result on the surface with carbon thereon is shown in FIGS. 2(A) and 2(B).

Figure 2A:
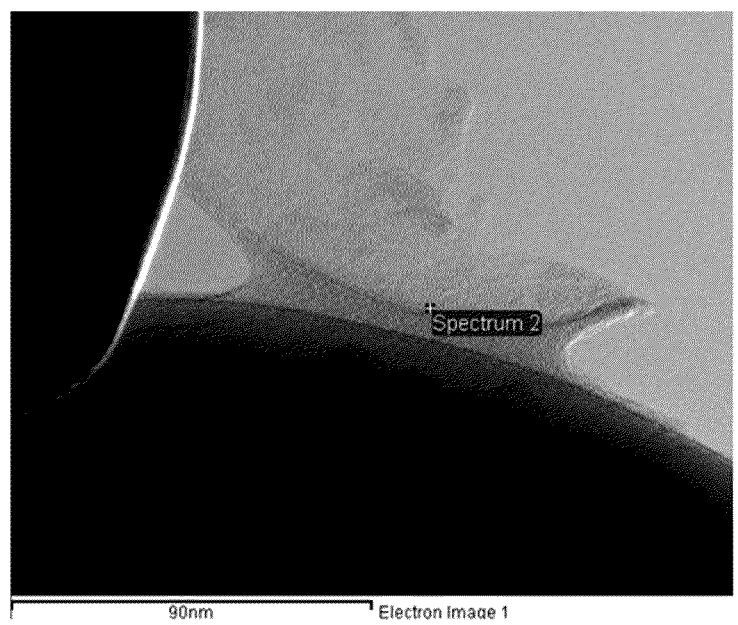
FIG. 2A shows a photograph obtained by measuring TEM-EDAX on the surface of the additive prepared according to Example 2.
Figure 2B:
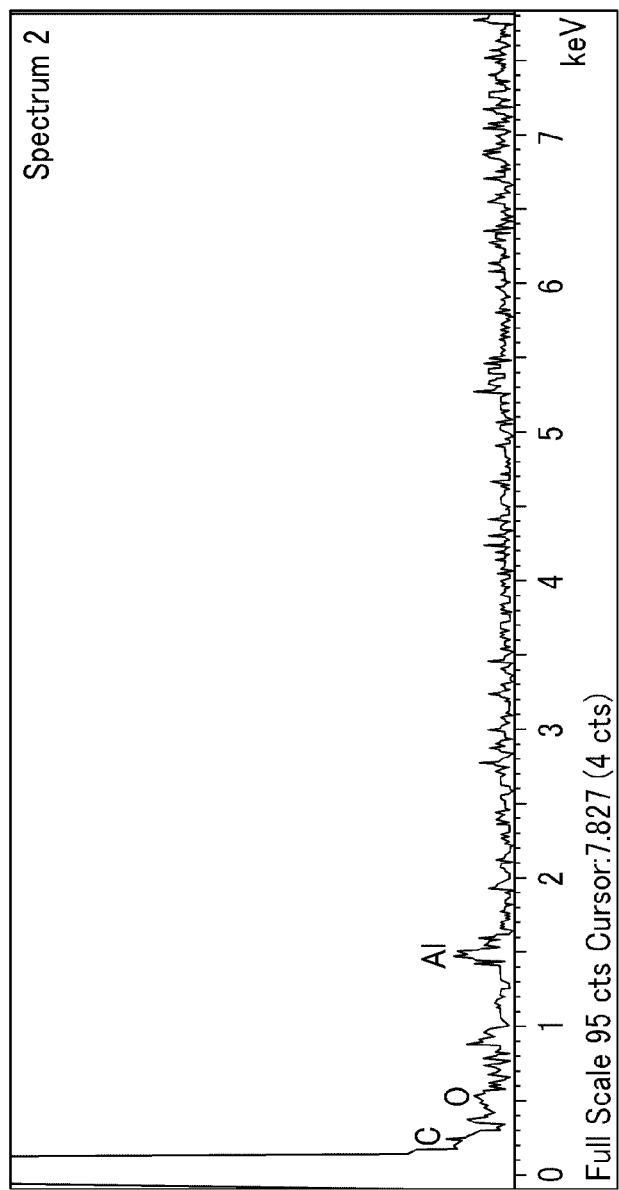
FIG. 2B shows a graph (B) obtained by measuring TEM-EDAX on the surface of the additive prepared according to Example 2.

As shown in FIG. 2A, there is carbon on the surface of the $Al_2O_3$ core. In particular, as shown in FIG. 2B, a carbon peak appears high, so it is obvious there is carbon on the surface of $Al_2O_3$.

Example 3

A negative active material slurry is prepared by mixing the additive at 10 wt % prepared according to Example 1, a graphite negative active material at 80 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated by using the negative electrode, a lithium metal counter electrode, and an electrolyte solution. As for the electrolyte solution, a mixed solvent of ethylene carbonate with $LiPF_6$ lithium salt dissolved therein, dimethyl carbonate, and diethyl carbonate in a volume ratio of about 3:3:1 is used.

Example 4

A negative active material slurry is prepared by mixing the additive at 10 wt % prepared according to Example 1, a petroleum soft carbon amorphous carbon negative active material at 75 wt %, a carbon black conductive material at 5 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode.

Example 5

A negative active material slurry is prepared by mixing the additive at 20 wt % prepared according to Example 1, a petroleum soft carbon amorphous carbon negative active material at 65 wt %, a carbon black conductive material at 5 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode Comparative Example 1

A negative active material slurry is prepared by mixing a graphite negative active material at 90 wt % and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode.

Comparative Example 2

A negative active material slurry is prepared by mixing a petroleum soft carbon amorphous carbon negative active material at 85 wt %, a carbon black conductive material at 5 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode.

Comparative Example 3

A negative active material slurry is prepared by mixing a petroleum soft carbon amorphous carbon negative active material at 65 wt %, an activated carbon additive at 20 wt % having a specific surface area of about 1400 $m^2/g$, a carbon black conductive material at 5 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode.

Comparative Example 4

A negative active material slurry is prepared by mixing a petroleum soft carbon amorphous carbon negative active material at 65 wt %, a grapheme nano-sheet additive at 20 wt %, a carbon black conductive material at 5 wt %, and a polyvinylidene fluoride binder at 10 wt % in an N-methyl pyrrolidone solvent. A negative electrode is fabricated by coating the negative active material slurry on a copper current collector having a thickness of about 10 μm, and drying, followed by pressing.

A half battery cell is fabricated according to the same method as Example 3 by using the negative electrode.

Example 6

A positive active material slurry is prepared by mixing a $LiCoO_2$ positive active material at 65 wt %, an activated carbon at 20 wt %, a carbon black conductive material at 5 wt %, and a polyvinylidene fluoride binder at 10 wt % in an N-methyl pyrrolidone solvent, and a positive electrode is fabricated by coating the positive active material slurry on a aluminum current collector having a thickness of about 15 μm, and drying, followed by pressing.

A negative active material slurry is prepared by mixing the additive at 10 wt % prepared according to Example 1, a graphite negative active material at 80 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A jelly roll is prepared by interposing a polyethylene separator between the positive electrode and the negative electrode fabricated as above, and winding the structure. A lithium rechargeable battery cell is manufactured by inserting the fabricated jelly roll into a cylindrical can having a diameter of about 18 mm and a length of about 65 mm, and injecting an electrolyte solution prepared by dissolving about 1 mol of lithium salt $LiPF_6$ in a mixed solvent of ethylene carbonate, dimethyl carbonate, and diethyl carbonate in a volume ratio of about 3:3:1 into the cylindrical can.

Example 7

A negative active material slurry is prepared by mixing the additive at 20 wt % prepared according to Example 1, a graphite negative active material at 70 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Example 8

A negative active material slurry is prepared by mixing the additive at 10 wt % prepared according to Example 1, a petroleum soft carbon amorphous carbon negative active material at 75 wt %, a carbon black conductive material at 5 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Example 9

A negative active material slurry is prepared by mixing the additive at 20 wt % prepared according to Example 1, a petroleum soft carbon amorphous carbon negative active material at 65 wt %, a carbon black conductive material at 5 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Example 10

A positive active material slurry is prepared by mixing a $LiCoO_2$ positive active material at 85 wt %, a carbon black conductive material at 5 wt %, and a polyvinylidene fluoride binder at 10 wt % in an N-methyl pyrrolidone solvent, and a positive electrode is fabricated by coating the positive active material slurry on a aluminum current collector having a thickness of about 15 μm, and drying, followed by pressing.

A negative active material slurry is prepared by mixing the additive at 20 wt % prepared according to Example 1, a graphite negative active material at 65 wt %, a carbon black conductive material at 5 wt %, and a polyvinylidene fluoride binder 10 at wt % in an N-methyl pyrrolidone solvent, and a negative electrode is fabricated by coating the negative active material slurry on a copper current collector having a thickness of about 10 μm, and drying, followed by pressing.

A jelly roll is prepared by interposing a polyethylene separator between the positive electrode and the negative electrode fabricated as above, and winding the structure. A lithium rechargeable battery cell is manufactured by inserting the fabricated jelly roll into a cylindrical can having a diameter of about 18 mm and a length of about 65 mm, and injecting an electrolyte solution prepared by dissolving about 1 mol of lithium salt $LiPF_6$ in a mixed solvent of ethylene carbonate, dimethyl carbonate, and diethyl carbonate in a volume ratio of about 3:3:1 into the cylindrical can.

Comparative Example 5

A negative active material slurry is prepared by mixing a graphite negative active material at 90 wt % and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Comparative Example 6

A negative active material slurry is prepared by mixing a petroleum soft carbon amorphous carbon negative active material at 85 wt %, a carbon black conductive material at 5 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Comparative Example 7

A negative active material slurry is prepared by mixing a petroleum soft carbon amorphous carbon negative active material at 75 wt %, an activated carbon at 10 wt %, a carbon black conductive material at 5 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Comparative Example 8

A negative active material slurry is prepared by mixing a petroleum soft carbon amorphous carbon negative active material at 75 wt %, a grapheme nanosheet at 10 wt %, a carbon black conductive material at 5 wt %, and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A lithium rechargeable battery cell is prepared according to the same method as Example 6 by using the negative electrode and the positive electrode, the electrolyte solution, and the separator of Example 6.

Comparative Example 9

A positive active material slurry is prepared by mixing a $LiCoO_2$ positive active material at 85 wt %, a carbon black conductive material at 5 wt %, and a polyvinylidene fluoride binder at 10 wt % in an N-methyl pyrrolidone solvent, and a positive electrode is fabricated by coating the positive active material slurry on a aluminum current collector having a thickness of about 15 μm, and drying, followed by pressin.

A negative active material slurry is prepared by mixing a graphite negative active material at 90 wt % and a polyvinylidene fluoride binder at 10 wt % in an N-methyl pyrrolidone solvent, and a negative electrode is fabricated by coating the negative active material slurry on a copper current collector having a thickness of about 10 μm, and drying, followed by pressing.

A jelly roll is prepared by interposing a polyethylene separator between the positive electrode and the negative electrode fabricated in the above, and winding the structure. A lithium rechargeable battery cell is manufactured by inserting the fabricated jelly roll into a cylindrical can having a diameter of about 18 mm and a length of about 65 mm, and injecting an electrolyte solution prepared by dissolving about 1 mol of lithium salt $LiPF_6$ in a mixed solvent of ethylene carbonate, dimethyl carbonate and diethyl carbonate in a volume ratio of about 3:3:1 into the cylindrical can.

The lithium rechargeable battery cells manufactured according to Examples 3 to 5 and Comparative Examples 1 to 4 are charged/discharged at 1 C, and their 1 C initial charge/discharge efficiencies are presented in Table 1.

TABLE 1

|  | 1 C initial charge and discharge efficiency (%) |
|---|---|
| Example 3 | 75.1 |
| Example 4 | 73.9 |
| Example 5 | 69.3 |
| Comparative Example 1 | 91.3 |
| Comparative Example 2 | 77.5% |
| Comparative Example 3 | 47.3 |
| Comparative Example 4 | 54.1 |

In Table 1, the lithium rechargeable battery cell of Comparative Example 1 using a graphite negative active material shows the best 1 C initial charge/discharge efficiency. In other words, since the graphite has a smaller irreversible capacity than other carbon materials, the lithium rechargeable battery cell of Comparative Example 1 using a graphite negative active material shows high charge/discharge efficiency at about 91% in the 1 C charge/discharge.

Also, the lithium rechargeable battery cell of Comparative Example 2 using a petroleum soft carbon negative active material shows low 1 C initial charge/discharge efficiency at about 77.5%, which is lower than that of Comparative Example 1.

Also, the lithium rechargeable battery cells of Examples 3 to 5 including the additive prepared according to Example 1 show a slightly lower 1 C charge/discharge efficiency than those of Comparative Examples 1 and 2.

In case of the lithium rechargeable battery cell of Comparative Example 3 using an activated carbon additive, the specific surface area is as great as about 1400 $m^2/g$. Thus, the SEI reaction is performed actively, which leads to low charge/discharge efficiency. Also, in case of the lithium rechargeable battery cell of Comparative Example 4 using graphene nanosheet, the SEI reaction is performed actively and thus the charge/discharge efficiency appears low.

While varying the charge/discharge rates to 1 C, 5 C, 20 C, and 50 C, the lithium rechargeable battery cells of Examples 6 to 10 and Comparative Examples 6 to 9 are charged/discharged once in each charge/discharge rate between a 3.0V cut-off charge and a 4.3V cut-off discharge. The charge/discharge test includes performing a charge/discharge at 5 C, performing a full-charge at 1 C, performing a discharge at 20 C, performing a full-discharge at 1 C, performing a charge and discharge once at 20 C, performing a full-charge at 1 C, performing a discharge at 50 C, performing a full-discharge at 1 C, and performing a charge and discharge once at 50 C.

The capacity is measured based on charge and discharge, and the 1 C charge and discharge capacity percentages at the respective SC, 10 C, and 20 C are calculated, and they are presented as charge characteristics and discharge characteristics in the following Tables 2 to 4. Also, charge/discharge at 6 C is performed for 500 times, and the percentage of the discharge capacity for 500-time charge/discharge to the discharge capacity for first charge/discharge based on is calculated and shown as cycle life in the following Tables 2 to 4. The discharge characteristics shown in Tables 2 to 4 are discharge characteristics at the respective discharge rates after full-charge is performed at 1 C under the above test conditions.

TABLE 2

|  | Charge characteristic (%) | | | Discharge characteristic (%) | | | Cycle-life (%) |
|---|---|---|---|---|---|---|---|
|  | 5 C/1 C | 20 C/1 C | 50 C/1 C | 5 C/1 C | 20 C/1 C | 50 C/1 C |  |
| Example 6 | 73 | 45 | 37 | 96 | 76 | 54 | 89 |
| Example 7 | 72 | 49 | 41 | 96 | 74 | 57 | 90 |
| Comparative Example 7 | 53 | 8.5 | — | 92 | 45 | 32 | 72 |
| Comparative Example 8 | 43 | 6.8 | — | 92 | 49 | 27 | 66 |

As shown in Table 2, the lithium rechargeable battery cells of Examples 6 and 7 using the negative electrodes including the additive prepared according to Example 1 have high-efficiency charge/discharge characteristics and high-efficiency cycle-life that are much better than those of Comparative Examples 7 and 8 using activated carbon and graphene nano-sheet, respectively.

The lithium rechargeable battery cells of Comparative Examples 7 and 8 have poor high-efficiency charge/discharge and cycle-life characteristics because a great deal of SEI is generated from the occlusion of lithium inside the activated carbon used as an additive and the occlusion of lithium cations through an exposed edge surface of grapheme nanosheet.

In particular, when the 50 C charge characteristics are compared, it may be seen that the lithium rechargeable battery cells of Examples 6 and 7 are charged because the charge characteristics are exhibited. However, it may be seen that those of Comparative Examples 7 and 8 are not charged at 50 C because the 50 C charge characteristic does not appear.

From this result, it may be concluded that the lithium rechargeable battery cells of Examples 6 and 7 have excellent high-efficiency charge and discharge characteristics, compared with the lithium rechargeable batteries of Comparative Examples 7 and 8.

TABLE 3

|  | Charge characteristic (%) | | | Discharge characteristic (%) | | | |
| --- | --- | --- | --- | --- | --- | --- | --- |
|  | 5 C/1 C | 20 C/1 C | 50 C/1 C | 5 C/1 C | 20 C/1 C | 50 C/1 C | Cycle-life (%) |
| Example 8 | 78 | 56 | 43 | 98 | 81 | 65 | 93 |
| Example 9 | 81 | 69 | 52 | 97 | 84 | 68 | 96 |
| Comparative Example 6 | 54 | 7.3 | — | 94 | 43 | 22 | 83 |

A shown in Table 3, the lithium rechargeable battery cells of Examples 8 and 9 using the negative electrodes including the additive prepared according to Example have excellent high-efficiency charge/discharge performance and cycle-life characteristics, compared with the lithium rechargeable battery cell of Comparative Example 6. As shown in Table 3, the lithium rechargeable battery cell of Comparative Example 6 also does not have the 50 C high-efficiency charge characteristic, like the lithium rechargeable battery cells of Comparative Examples 7 and 8.

Also, the lithium rechargeable battery cell of Example 9 including the additive at 20 wt % prepared according to Example 1 has much better high-efficiency charge/discharge performance and cycle-life than the lithium rechargeable battery cell of Example 8 including the additive at 10 wt %.

TABLE 4

|  | Charge characteristic (%) | | | Discharge characteristic (%) | | | |
| --- | --- | --- | --- | --- | --- | --- | --- |
|  | 5 C/1 C | 20 C/1 C | 50 C/1 C | 5 C/1 C | 20 C/1 C | 50 C/1 C | Cycle-life (%) |
| Example 10 | 38 | 21 | 11 | 94 | 53 | 41 | 77 |
| Comparative Example 9 | 12 | — | — | 92 | 46 | 21 | — |

It is shown in Table 4 that the lithium rechargeable battery cell of Comparative Example 9 has a poor high-efficiency charge/discharge characteristic. The lithium rechargeable battery cell of Comparative Example 9 is a typical lithium rechargeable battery cell that does not use an additive in the positive electrode and the negative electrode but uses a graphite negative active material. It appears that the high-efficiency charge/discharge characteristic is deteriorated due to the structural characteristic of the graphite negative active material.

Generally, the higher the crystallization of carbon becomes, the less space a carbon material has inside. Thus; the density is high, and the orientation of a crystal face becomes excellent. This leads to excellent occlusion capability of lithium cations, and excellent discharge characteristic. However, the charge characteristic is relatively inferior to the discharge characteristic.

The characteristic that the charge characteristic is inferior to the discharge characteristic becomes a problem in a high-efficiency charge/discharge more than in the low-efficiency charge/discharge. In consequence, as shown in Table 4, the lithium rechargeable battery cell of Comparative Example 9 has a deteriorated high-efficiency charge characteristic because neither the 50 C charge characteristic nor the 20 C charge characteristic is acquired. Also, due to the poor high-efficiency charge characteristic, 6 C cycle-life is also not acquired.

On the other hand, as shown in Table 4, in the lithium rechargeable battery cell of Example 10 using the additive prepared according to Example 1 only for the negative electrode, the high-efficiency charge/discharge characteristic is acquired and the cycle-life characteristic is improved despite the use of the graphite negative active material having a poor charge characteristic.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims. Therefore, the above-mentioned embodiments are examples but do not limit in any sense.

What is claimed is:

1. A negative electrode, comprising:
   a negative active material; and
   an additive including particles with a ceramic core surrounded by a carbon layer;
   wherein the ceramic core comprises $Al_2O_3$, $ZrO_2$, or a combination thereof;
   wherein the additive is included in an amount from about 10 to 50 parts by weight based on 100 parts by weight of the negative active material.

2. The negative electrode of claim 1, wherein the carbon is selected from the group consisting of crystalline carbon, amorphous carbon, and a combination thereof.

3. The negative electrode of claim 1, wherein the carbon has D/G (I (1340 $cm^{-1}$ to 1365 $cm^{-1}$)/I (1580 $cm^{-1}$ to 1595 $cm^{-1}$)), which is a Raman spectrum integral intensity of a (D band: 1340 $cm^{-1}$ to 1365 $cm^{-1}$) surface and a (G band: 1580 $cm^{-1}$ to 1595 $cm^{-1}$) surface from about 1 to about 4.

4. The negative electrode of claim 1, wherein the carbon exists on the surface of the ceramic core in a thickness of from about 2 nm to about 2 μm.

5. The negative electrode of claim 1, wherein the average particle diameter of the additive is from about 10 nm to about 5 μm.

6. The negative electrode of claim 1, wherein the specific surface area of the additive is from about 10 m²/g to about 3000 m²/g.

7. The negative electrode of claim 1, wherein the specific surface area of the additive is from about 50 m²/g to about 3000 m²/g.

8. The negative electrode of claim 1, wherein the additive is included in an amount from about 10 to 30 parts by weight based on 100 parts by weight of the negative active material.

9. The negative electrode of claim 1, wherein the carbon exists in an amount of more than about 0 wt % to about 50 wt % or less based on the total weight of the additive.

10. The negative electrode of claim 1, wherein the carbon exists in an amount from about 0.1 wt % to about 30 wt % based on a total weight of the additive.

11. The negative electrode of claim 1, wherein the negative active material is selected from the group consisting of a material capable of reversibly intercalating/deintercalating lithium cations, a lithium metal, a lithium metal alloy, a material capable of doping and dedoping lithium, a transition metal oxide, and a combination thereof.

12. The negative electrode of claim 1, wherein the negative electrode further comprises a conductive material.

13. An energy storage device, comprising:
a positive electrode including a positive active material;
an electrolyte; and
a negative electrode comprising:
a negative active material and an additive including particles with a ceramic core surrounded by a carbon layer;
wherein the ceramic core comprises $Al_2O_3$, $ZrO_2$, or a combination thereof,
wherein the additive is included in an amount from about 10 to 50 parts by weight based on 100 parts by weight of the negative active material.

14. The energy storage device of claim 13, wherein the carbon is selected from the group consisting of crystalline carbon, amorphous carbon, and a combination thereof.

15. The energy storage device of claim 13, wherein the carbon has D/G (I ($1340\ cm^{-1}$ to $1365\ cm^{-1}$)/I ($1580\ cm^{-1}$ to $1595\ cm^{-1}$)), which is a Raman spectrum integral intensity of a (D band: $1340\ cm^{-1}$ to $1365\ cm^{-1}$) surface and a (G band: $1580\ cm^{-1}$ to $1595\ cm^{-1}$) surface from about 1 to about 4.

16. The energy storage device of claim 13, wherein the carbon exists on the surface of the ceramic core in a thickness of from about 2 nm to about 2 μm.

* * * * *